United States Patent
Rothwell

[15] 3,658,474
[45] Apr. 25, 1972

[54] PROCESS FOR CLARIFICATION OF AN IMPURE ACIDIC TITANIUM SULPHATE LIQUOR AND/OR THE MANUFACTURE OF TITANIUM DIOXIDE THEREFROM

[72] Inventor: Eric Rothwell, Bradford, England

[73] Assignee: Allied Colloids Manufacturing Company Limited, Bradford, Yorkshire, England

[22] Filed: July 16, 1970

[21] Appl. No.: 55,587

Related U.S. Application Data

[63] Continuation-in-part of Ser. No. 719,710, Apr. 8, 1968, abandoned.

[30] Foreign Application Priority Data

Apr. 14, 1967 Great Britain ...................... 17,153/67

[52] U.S. Cl. .............................. 23/202 R, 23/117, 209/5, 210/54
[51] Int. Cl. ........................................ C01g 23/04
[58] Field of Search ................ 23/202 R, 117; 75/1, 2; 209/5; 210/54

[56] References Cited

UNITED STATES PATENTS

| | | | |
|---|---|---|---|
| 3,416,885 | 12/1968 | Honchan | 23/202 X |
| 3,069,235 | 12/1962 | Schechter et al. | 23/202 |
| 3,023,162 | 2/1962 | Fordyce et al. | 75/1 X |
| 3,418,237 | 12/1968 | Booth et al. | 75/1 X |
| 2,909,508 | 10/1959 | Jones | 75/2 X |

FOREIGN PATENTS OR APPLICATIONS 776,503 6/1957 Great Britain

*Primary Examiner*—Herbert T. Carter
*Attorney*—Beveridge & Degrandi

[57] ABSTRACT

The present invention relates to the manufacture of titanium dioxide wherein titanium sulphate liquor is produced containing colloidal and suspended impurities which are flocculated and removed from the liquor before the titanium dioxide is obtained by hydrolysis. More particularly it relates to the improvement of such manufacture comprising mixing the liquor, prior to hydrolysis, with a solution of (a) a polymer of an acrylic acid ester of the general formula:

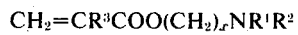

$$CH_2=CR^3COO(CH_2)_xNR^1R^2$$

wherein $x$ is 2, 3 or 4, $R^1$ and $R^2$ are each selected from the group consisting of hydrogen and alkyl groups containing up to eight carbon atoms and $R^3$ is a member selected from the group consisting of hydrogen and methyl, or (b) a water-soluble salt of said ester or (c) a copolymer of said ester with an ethylenically unsaturated comonomer, or (d) a copolymer of a water-soluble salt of said ester with an ethylenically unsaturated comonomer; the polymer or copolymer having a molecular weight such that the viscosity of a 1 percent by weight aqueous solution thereof as measured in a No. 3 Suspended Level Viscometer at 25° C. is at least 40 centistokes, the comonomer being either water-soluble and present to the extent of not more than 40 percent by weight of the copolymer or water-insoluble and present to the extent of not more than 15 percent by weight of the copolymer.

8 Claims, No Drawings

PROCESS FOR CLARIFICATION OF AN IMPURE ACIDIC TITANIUM SULPHATE LIQUOR AND/OR THE MANUFACTURE OF TITANIUM DIOXIDE THEREFROM

This application is a continuation-in-part of Application Ser. No. 719,710 filed Apr. 8, 1968, and now abandoned.

The present invention concerns improvements in clarification, particularly of titanium sulphate liquor and the sedimentation of the impurities contained therein.

The early stages in the manufacture of titanium dioxide pigment by the so-called "Sulphate Process" comprise the sulphation of titaniferous ores or slags with sulphuric acid to produce eventually an aqueous acidic liquor containing the sulphates of titanium and other metals in solution. Such liquors contain also suspended insoluble impurities in particulate or colloidal form which are largely comprised of undissolved ore and siliceous or earthy matter.

Ultimately the titanium dioxide is obtained by hydrolysis of the purified acidic liquor and at some time prior to the hydrolysis it is necessary to free the liquors from the above mentioned insoluble impurities. This is commonly achieved by a clarification stage in sedimentation tanks, and the clarification process may be aided by a subsequent filtration stage.

It is common practice to assist clarification by the introduction of a clarification reagent and to this end, in many cases, a compound of antimony is introduced at the sulphation stage so that antimony is present in a soluble form in the titanium sulphate liquor.

On treating the liquor subsequently, with sodium sulphide a flocculant precipitate of antimony sulphide is formed, which in the course of its formation and settling, coagulates and causes co-settling of the above mentioned impurities in a convenient manner.

This use of antimony as a clarification aid suffers however from several disadvantages. These include the not insubstantial cost of treatment, limitations in the speed of clarification which is obtainable, and the liberation of the toxic and corrosive hydrogen sulphide gas during precipitation.

There have been several attempts in the past to achieve this clarification by means of organic reagents such as, for example, surface-active agents of the sulpho-succinate type and particularly polymeric agents of the hydrolyzed protein class. However, the low efficiency of such materials has precluded or restricted their use on a large scale.

More interest has recently been attached to the use of synthetic polymeric electrolytes which have a flocculating and sedimenting action because of their ability to be adsorbed onto the surface of suspended particles by virtue of polar groups on the polymer chain, and which further because of their molecular size have the ability to form bridges between particles, thus causing them to cluster into large aggregates having superior settling characteristics to the individual particles.

One particular group of synthetic polymers which has been proven to be economically effective as a means of clarification of titanium sulphate liquors comprises the so-called "Polyamide-epichlorhydrin" resins such as have found employment in the paper industry because of their flocculating efficiency towards paper constituents. Such products are based on resins formed by the condensation of polyamines, e.g. diethylene triamine and dibasic acids, e.g. adipic acid. Although such products have proven to be of value as clarification aids for titanium sulphate liquor, they suffer from certain limitations. Thus the polymer chain contains amide groups which are susceptible to hydrolysis with consequent reduction of the polymer chain length so that on storage, hydrolytic degradation reduces the effectiveness of the products. At the operating temperature 50° C. or higher of the clarification process the tendency to degradation is aggravated and in many cases severely limits both the clarification action and the subsequent settling characteristics of the flocculated impurities. Furthermore, such products do not appear to be capable of preparation at very high molecular weights, which limits their efficiency. Attempts to produce higher molecular weights by reaction with cross-linking reagents, e.g. epichlorhydrin, limits the stability of the products so that they tend to become insoluble when stored at commercially useful concentrations.

Many other synthetic polyelectrolytes are mentioned in the literature as being useful as flocculating agents for mineral suspensions. It is in fact true to state that all polyelectrolytes can produce flocculation of suspended particles in aqueous solution when the polyelectrolyte carries the appropriate polar groups and has a large molecular size when in solution. In this respect the molecular weight need not be very high for a flocculating or aggregating effect to be detectable visually on addition of the polymer to a particular suspnesion of particles. The molecular weight can, in fact, be as low as say 20,000.

Thus, British Patent No. 768,665 describes the use of synthetic cationic polyelectrolytes as aggregating agents and mentions particularly molecular weights of 15,000 to 100,000. Included in the examples of active compositions are polymers based on acrylamide, polymers derived from cationic acrylates such as dimethyl amino ethyl methacrylate and various others for example polymers derived from vinyl pyridine. Likewise British Patent No. 776,503 suggests the use of polymers derived from cationic acrylates, specifically N-tertiary alkyl amino alkyl acrylates, for the purpose of agglomerating soil.

However, in the present day application of polyelectrolyte flocculants as industrial sedimentation aids as compared with their use as soil conditioning or filtration aids there are many important factors which govern the choice of the flocculating agent. The principal ones are on the one hand the nature of the substrate being treated and the equipment in which the treatment is to be carried out and on the other hand the character of the flocculation to be produced. With respect to the latter property for instance the major effects required may be clarity of supernatant liquor, or the initial rate of settlement, or the overall rate of settlement, or the degree or rate of compaction of the settled aggregates or the redispersion characteristics of the settled aggregates or combinations of two or more such properties. With all these requirements to fulfill therefore a selection of polymer characteristics is necessary and these depend in a highly specific manner on the chemical structure of the polymer and its molecular weight, and its physical structure in solution.

It has been found for instance that the cationic polyelectrolytes as quoted in the above mentioned patents do not directly yield products which are effective flocculants for the clarification of titanium sulphate liquor. Thus vinyl pyridine polymers have found to be inactive. Cationic acrylate polymers are likewise inactive unless their composition and molecular weights fall within the ranges of the present invention. Polyacrylamide is inactive. Copolymers of acrylamide and a cationic acrylate, more specifically a quaternary salt derived from the methylation of an alkyl amino alkyl acrylate, wherein the copolymers contain at the most 40 percent of the cationic constituent and which have a molecular weight exceeding 1 million and which are extremely effective flocculants and sedimentation aids in the paper and various mineral processing industries are likewise inactive in the clarification of titanium sulphate liquor.

In recent years another major class of synthetic polyelectrolyte flocculants has become important as industrial clarification and sedimentation aids. These comprise the anionic polyacrylamides and while British Patent No. 768,662 covers the use of anionic polyelectrolytes generally as aggregating agents, more recently the outstanding advantage of specificity with regard to molecular strucutre for industrial sedimentation work has become apparent for example in British Patent No. 901,916 where high molecular weight copolymers of acrylic acid and acrylamide are cited, the acrylamide content of such copolymers being specifically present within the proportions of 75 to 45 percent. Here again it has been found that such polymers are of little effect as clarification aids for titanium sulphate liquor.

Another major group of flocculating agents which enjoys widespread commercial usage are those cationic polymeric electrolytes based on polyethylene imine. These comprise linear and chain-branched derivatives having molecular weights ranging from about 2,000 to 100,000 and because of their relatively high charge density, namely one positively charged nitrogen atom per three atoms of the polymer chain, are considered to have exceptional ability for the coagulation and flocculation of fine particle suspensions and consequently find employment in the paper-making and sewage treatment fields. These products likewise have been found to be ineffective for the clarification and sedimentation of titanium sulphate liquor.

It is a fact, therefore, that a very wide range of synthetic polyelectrolytes which, because of their ionic charge, are capable of acting as aggregating agents or which, because of their high molecular weight and/or their chemical composition, are used as economical and effective sedimentation and clarification aids, show surprisingly little or no effect on the clarification of titanium sulphate liquors.

It appears, therefore, that the clarification of such liquors demands of the flocculant some important properties additional to the normal parameters such as molecular weight, charge type and charge density which govern most flocculant applications. It is particularly surprising to find that the required properties are shown by the narrow range of synthetic cationic polymers and copolymers whose usage in titanium sulphate clarification is the object of this invention, and that such materials also show surprisingly high resistance to degradation in that they maintain their effectivenesss as flocculants and sedimentation aids throughout many hours of exposure to the hot, strongly acidic environment of the titanium sulphate settling tanks and thereafter in subsequent processes.

According to the present invention therefore in a process for the manufacture of titanium dioxide wherein titanium sulphate liquor is produced containing colloidal and suspended impurities which are flocculated and removed from the liquor before the titanium dioxide is obtained by hydrolysis, the improvement which comprises mixing the liquor, prior to hydrolysis, with a solution of (a) a polymer of an acrylic acid ester of the general formula:

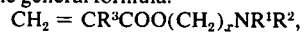
$$CH_2 = CR^3COO(CH_2)_xNR^1R^2,$$

wherein $x$ is 2, 3 or 4, $R^1$ and $R^2$ are each selected from the group consisting of hydrogen and alkyl groups containing up to eight carbon atoms and $R^3$ is a member selected from the group consisting of hydrogen and methyl, or (b) a water-soluble salt of said ester or (c) a copolymer of said ester with an ethylenically unsaturated comonomer, or (d) a copolymer of a water-soluble salt of said ester with an ethylenically unsaturated comonomer; the polymer or copolymer having a molecular weight such that the viscosity of a 1 percent by weight aqueous solution thereof as measured in a No. 3 Suspended Level Viscometer at 25° C. is at least 40 centistokes, the comonomer being either water-soluble and present to the extent of not more than 40 percent by weight of the copolymer or water-insoluble and present to the extent of not more than 15 percent by weight of the copolymer.

All the viscosity measurements referred to in this specification were measured at 25° C. in a suspended level viscometer Type Mark BS/IP/SL as described in British Standard Specification 188, 1957.

It is preferred to use a polymer or copolymer whose 1 percent by weight aqueous solution viscosity as measured in a Number 3 suspended level viscometer at 25° C. lies within the range 80 to 200 centistokes.

If a polymer or copolymer having too high a molecular weight, is used this can cause difficulties in handling and in distribution in the liquor.

It is preferred to use copolymers of the cationic esters of acrylic or methacrylic acid as defined above or of a simple salt or quaternary salt thereof with an ethylenically unsaturated monomer. If this comonomer is water-soluble it is present to the extent of not more than 40 percent by weight, more particularly from 3 to 30 percent by weight, of the copolymer. If, on the other hand, it is a water-insoluble comonomer then it is present to the extent of no more than 15 percent by weight, more particularly 3 to 10 percent by weight, of the copolymer.

Preferred water-soluble comonomers are vinyl pyrrolidone, acrylic acid, methacrylic acid, crotonic acid, itaconic acid, maleic acid, fumaric acid, the mono-alkyl esters of maleic acid or fumaric acid; the amides or their hydroxyethyl or hydroxypropyl esters of any of these acids and alkyl vinyl ethers.

Preferred water-insoluble comonomers are the alkyl esters derived from acrylic or methacrylic acid and alcohols of general formula $C_nH_{2n+1}OH$ where $n = 1$ to 8, styrene, methyl styrene, vinyl acetate, vinyl propionate, vinyl butyrate, and acrylonitrile.

The polymers and copolymers of this invention can be prepared for example by vinyl polymerization of mixtures of the comonomers with redox initiator systems, or in some cases by chemical modification of a pre-formed polymer. Thus for example a copolymer of methacrylic acid and a dialkyl amino methacrylate may be prepared by polymerizing in aqueous solution mixture of the two monomers using a persulphate as an initiator or alternatively by chemical modification such as by hydrolysis of an ester homopolymer e.g. by controlled hydrolysis of polydimethyl amino methacrylate.

The invention will be more clearly understood by reference to the following examples. In all these examples the products being tested are introduced into the titanium sulphate liquor in the form of their 0.5 percent by weight aqueous solution. The dosage level is indicated as parts per million on the liquor meaning parts by weight of polymer or copolymer on the liquor quantity

EXAMPLE 1

Titanium sulphate liquor was prepared by dissolving 1,500 gm. of sulphated ilmenite ore in 1,500 ml. of water at 65° C. This solution was reduced by treatment with iron filings until a diluted sample of the liquor no longer gave a red coloration with ammonium thiocyanate. The reduced liquor was finally decanted from undissolved iron and the density adjusted to 1.6 by the addition of water. Liquor prepared in this manner is typical of that occurring during the industrial preparation of titanium dioxide pigment from ilmenite by the sulphate process.

To 50 ml. quantities of this liquor, the products of the invention and products of known flocculating activity were added at a concentration of 100 parts per million and with thorough mixing. The treated liquor was allowed to stand at 65° C. and examined for clarification effects.

The results are given in Table 1.

By "strong flocculation" is meant a clearly formed floc structure which settles fairly rapidly so that there is less than 50 percent settled solids volume in 10 minutes.

By "moderate flocculation" is meant a clearly formed floc structure settling slowly so that there is less than 50 percent settled solids volume in 40 minutes.

By "slight flocculation" is meant a floc structure is evident but there is little tendency to settle so that after standing for 1 hour a well defined settled solids/liquor interface is not apparent.

It can be seen from these results that a very wide variety of commercial flocculant types have been examined but that only two narrow groups of compounds are effective. These are the polyamide-epichlorhydrin resins and products of this invention as described in detail earlier.

TABLE 1

| Flocculating agent added | Result |
| --- | --- |

1. Acetate of copolymer of diethyl amino ethyl acrylate and cetyl methacrylate in weight ratio 50:50. 1% solution viscosity 3.4 centistokes. — No action
2. Copolymer of methylated diethylamino ethyl acrylate and acrylamide in weight ratio 40:60. 1% solution viscosity 2.6 centistokes. — Slight flocculation
3. Polymer of methylated diethylamino ethyl acrylate. 1% solution viscosity 4.3 centistokes. — Slight flocculation
4. Copolymer of methylated diethylamino ethyl acrylate and acrylamide in weight ratio 60:40. 1% solution viscosity 195 centistokes — Moderate flocculation
5. Acetate of polymer of diethylamino ethyl acrylate. 1% solution viscosity 43 centistokes. — Strong flocculation
6. Polymer of methylated diethylamino ethyl acrylate, 1% solution viscosity 56 centistokes. — Strong flocculation
7. Copolymer of methylated diethylamino ethyl acrylate and acrylamide in weight ratio 70:30. 1% solution viscosity 150 centistokes — Strong flocculation
8. Copolymer of sodium acrylate and acrylamide in weight ratio 10:90. 1% solution viscosity 230 centistokes. — Slight flocculation
9. Copolymer of sodium acrylate and acrylamide in weight ratio 40:60. 1% solution viscosity 6,300 centistokes. — Slight flocculation
10. Polystyrene sulphonic acid, 5% solution viscosity 26 centistokes. — No Action
11. Sodium dioctyl sulphosuccinate. — No Action
12. Polyacrylamide, 1% solution viscosity 400 centistokes. — Slight flocculation
13. Polyvinyl pyrrolidone. 30% solution viscosity 180 centistokes. — Slight flocculation
14. Norwegian animal glue. — Slight flocculation
15. Triethylene tetramine — No Action
16. Polyethylene-imine. 25% solution viscosity 950 centistokes — Slight flocculation
17. Polyamide epichlorhydrin resin. 10% solution viscosity 1200 centistokes. — Strong flocculation
18. Cationic condensation product of tannin, ethanol-amine and formaldehyde according to British Pat. No. 899,721. — No Action
19. Hydrosulphate of polyvinyl pyridine, as described in British Pat. No. 768,665. — Slight flocculation

EXAMPLE 2

A titanium sulphate liquor was prepared according to the procedure defined in Example 1.

The polymers used in this example were copolymers prepared by free radical polymerization of mixtures of diethyl amino ethyl acrylate quaternised by dimethyl sulphate and hydroxy ethyl or hydroxy propyl acrylate. The products were tested by adding them at a concentration of 100 parts per million to 250 ml. quantities of titanium sulphate liquor held at a temperature of 65° C. in an open beaker. The liquor was stirred for 30 seconds at 300 revolutions per minute after the addition of the reagents and thereafter for 30 seconds at 150 revolutions per minute. The beaker contents were then transferred to a measuring cylinder and the rate of settlement of suspended solids observed.

The results are given in Table 2.

In this test an efficient reagent will produce a settled solids volume comprising 30 percent of the total liquor volume within 30 minutes. A higher settled solids volume after this time would be an unfavorable result in plant practice.

TABLE 2

| Polymer composition | 1% solution viscosity (centistokes) | % volume of settled solids after 30 minutes |
| --- | --- | --- |
| 5 parts of hydroxy ethyl acrylate (HEA) 95 parts of quaternised diethyl amino ethyl acrylate (q DEAEA) | 35 | 65 |
| —do— | 88 | 28 |
| —do— | 156 | 25 |
| 10 parts of HEA 90 parts of q DEAEA | 20 | 53 |
| —do— | 53 | 26 |
| —do— | 125 | 21 |
| 20 parts of HEA 80 parts of q DEAEA | 38 | 60 |
| —do— | 195 | 27 |
| 30 parts of HEA 70 parts of q DEAEA | 32 | 67 |
| —do— | 95 | 29 |
| 50 parts of HEA 50 parts of q DEAEA | 430 | No effect |
| 10 parts of hydroxy propyl acrylate (HPA) 90 parts of quaternised diethylamino ethyl acrylate (q DEAEA) | 32 | 48 |
| —do— | 69 | 28 |
| 20 parts of HPA 80 parts of q DEAEA | 35 | 50 |
| —do— | 50 | 30 |
| —do— | 350 | 24 |
| 40 parts of HPA 60 parts of q DEAEA | 78 | 30 |
| —do— | 540 | 28 |
| 50 parts of HPA 50 parts of q DEAEA | 870 | No effect |

EXAMPLE 3

To 100 ml. quantities of titanium sulphate liquor, prepared as in Example 1 above and held in measuring cylinders at 65° C. were added various amino alkyl acrylates as solutions in dilute acetic acid. The dosage of reagent was 75 parts per million on the volume of liquor used. Immediately after addition of the reagents the cylinder contents were shaken by hand to disperse the reagent. The volume of sediment accumulating after 20 minutes standing was then measured.

In this test a sediment volume at 20 minutes amounting to 35 percent of the total liquor volume would be an acceptable result in plant practice.

TABLE 3

| Polymer composition | Viscosity of 1% solution in acetic acid (centistokes) | % volume of settled solids after 20 minutes |
| --- | --- | --- |
| Diethylamino ethyl acrylate | 12 | 57 |
|  | 32 | 42 |
|  | 80 | 31 |
|  | 190 | 29 |
| Diethylamino propyl acrylate | 17 | 60 |
|  | 27 | 53 |
|  | 85 | 32 |
| Dimethyl amino ethyl methacrylate | 25 | 49 |
|  | 59 | 34 |
| Di(2 ethyl hexyl) amino ethyl methacrylate | 12 | No effect |
|  | 50 | 35 |
|  | 102 | 30 |

EXAMPLE 4

A titanium sulphate liquor was prepared according to the procedure outlined in Example 1. To 50 ml. quantities of the liquor in measuring cylinders were added 150 parts per million of various reagents which were mixed by thorough shaking. After allowing to stand in a water bath at 65° C. for 15 minutes the degree of settlement and clarification of the supernatant liquor were assessed visually.

In this test a satisfactory result would be a settled solids volume amounting to less than 40 percent of the total liquor volume and a supernatant liquor visibly free from suspended particles.

TABLE 4

| Polymer composition | Solution viscosity | Percent volume of settled solids after 15 minutes | Clarity of supernatant liquor |
|---|---|---|---|
| Polyamide-epichlorhydrin | 11 centistokes at 10% | 35 | Fairly clear. |
| | 210 centistokes at 1% | 47 | Very cloudy. |
| Polyethylene imine | 400 centistokes at 25% | | Very little effect. |
| 60/40 Acrylamide/sodium acrylate copolymer | 4,000 centistokes at 1% | (¹) | |
| 90/10 Acrylamide/quaternised-diethylamino ethyl acrylate (q. DEAEA) | 140 centistokes at 1% | (¹) | |
| Acrylamide/q. DEAEA: | | | |
| 60/40 | 195 centistokes at 1% | 58 | Very cloudy. |
| 50/50 | 213 centistokes at 1% | 55 | Do. |
| 30/70 | 670 centistokes at 1% | 39 | Slightly cloudy. |
| 20/80 | 170 centistokes at 1% | 34 | Clear. |
| 10/90 | 75 centistokes at 1% | 30 | Do. |
| 5/95 | 64 centistokes at 1% | 32 | Do. |

¹ No action.

EXAMPLE 5

Following the procedure of Example 3 the following results were obtained using polymers from dimethylsulphate quaternized diethyl amino ethyl acrylate with various other monomers. The dosage of reagent used was 200 parts per million on the liquor treated.

TABLE 5

| Polymer composition | 1% Solution viscosity (centistokes) | % Volume of settled solids after 20 minutes |
|---|---|---|
| 50/50 Q DEAEA/acrylic Acid | 53 | No action |
| 70/30 " | 68 | 34 |
| 80/20 " | 83 | 33 |
| 90/10 " | 62 | 27 |
| 40/60 Q DEAEA methacrylamide | 58 | No action |
| 60/40 " | 72 | 35 |
| 80/20 " | 70 | 28 |
| 40/60 Q DEAEA/N methylol acrylamide | 620 | No action |
| 60/40 " | 850 | 33 |
| 80/20 " | 170 | 30 |
| 40/60 Q DEAEA/vinyl pyrrolidone | 128 | No action |
| 70/30 " | 100 | 27 |
| 40/60 Q DEAEA/mono iso butyl maleate | 96 | 59 |
| 70/30 " | 85 | 33 |
| 60/40 Q DEAEA/methyl acrylate | 141 | No action |
| 80/20 " | 90 | 54 |
| 85/15 " | 77 | 30 |
| 95/5 " | 104 | 28 |
| 80/20 Q DEAEA vinyl acetate | 53 | 70 |
| 85/15 " | 62 | 30 |
| 80/20 Acetate of DEAEA styrene | 47 | No action |
| 85/15 " | 50 | 35 |
| 80/20 Acetate of DEAEA acrylonitrile | 124 | 61 |
| 85/15 " | 83 | 35 |
| 95/5 " | 93 | 32 |

EXAMPLE 6

One thousand milliliters quantities of freshly prepared titanium sulphate liquor were gently agitated in beakers placed in a water bath maintained at 65° C. The products to be tested were added at a dose rate of 100 parts per million based on the liquor quantity, and agitation continued for a period of 3 hours. At various intervals of time, 250 ml. samples were withdrawn from the treated liquors and the settlement characteristics assessed visually in measuring cylinders by first inverting the stoppered cylinders four times to homogenize the contents and then measuring the rate of solids settlement.

The products compared and the results obtained are quoted in Table 6.

TABLE 6

| Polymer composition | Heating time (hours) | Settled solids volume at (minutes) | | | | | |
|---|---|---|---|---|---|---|---|
| | | 4 | 6 | 8 | 10 | 12 | 20 |
| A. Polyamide-epichlorhydrin resin. 11 centistokes at 10% | 1½ | 0 | 0 | 0 | 0 | 0 | 140 |
| | 3 | 0 | 0 | 0 | 0 | 0 | 0 |
| B. Quaternised diethylamino ethyl acrylate. 33 centistokes at 1% | 1½ | 0 | 0 | 142 | 132 | 106 | 88 |
| | 3 | 0 | 0 | 0 | 190 | 172 | 160 |
| C. Quaternised diethylamino ethyl acrylate. 75 centistokes at 1% | 1½ | 0 | 172 | 130 | 118 | 102 | 90 |
| | 3 | 0 | 0 | 185 | 160 | 142 | 136 |
| D. 10/90 Methyl acrylate/Q DEAEA. 72 centistokes at 1% | 1½ | 0 | 154 | 134 | 120 | 108 | 98 |
| | 3 | 0 | 195 | 178 | 164 | 150 | 130 |
| E. 10/90 Acrylamide/Q DEAEA. 75 centistokes at 1% | 1½ | 138 | 136 | 96 | 68 | 57 | 49 |
| | 3 | 0 | 0 | 170 | 158 | 140 | 110 |

From these results it can be seen that product A has lost nearly all ability to flocculate after only 1½ hours, due to its destruction by hydrolysis. The other products are seen to be resistant to hydrolytic degradation, their floc holding effects differing mainly in the resistance to the disruptive action of the continuous agitation.

Another advantage conferred by the use of the products of the invention lies in a subsidiary process commonly carried out during the manufacture of titanium dioxide by the sulphation process, and which involves washing of the settled solids from the titanium sulphate clarifier in a further solids-settling system, in order to recover the valuable titanium-bearing liquor entrained therein. Because of the nature of the process the resedimentation characteristics of the washed solid particles are once more of importance and it is common practice to use sedimentation aids at this stage also in order to achieve rapid separation of the solids from the wash liquors. When however the titanium sulphate liquor is clarified using the products of the invention it has been found that the strong floc structure thereby produced persists to a considerable extent throughout the water-washing treatment and facilitates the final solids-liquid separation thus reducing or eliminating the need for additional flocculating aids.

EXAMPLE 7

In this example, the settled solids from the 2 hour agitation test of the type described in Example 6 were isolated by decanting off the supernatant liquor. The settled solids were transferred to 250 ml. graduated cylinders and after the addition of 200 ml. of water, were homogenized by inverting four times. The settling characteristics were then noted after 3 minutes standing.

The results obtained were as follows:

Product A gave a settled solids volume of 68 ml. and extremely cloudy supernatant liquor.

Product B gave a settled solids volume of 48 ml. and cloudy supernatant liquor.

Product E gave a settled solids volume of 32 ml. and clear supernatant liquor.

I claim:

1. In a process for the manufacture of titanium dioxide wherein titanium sulphate liquor is produced containing colloidal and suspended impurities which are flocculated and removed from the liquor before the titanium dioxide is obtained by hydrolysis, the improvement which comprises mixing the liquor, prior to hydrolysis, with a flocculating solution of (a) a copolymer of an acrylic acid ester of the general formula:

$$CH_2 = CR^3COO(CH_2)_x NR^1R^2,$$

wherein $x$ is 2, 3 or 4, $R^1$ and $R^2$ are each selected from the group consisting of hydrogen and alkyl groups containing up to eight carbon atoms and $R^3$ is a member selected from the group consisting of hydrogen and methyl, with an ethylenically unsaturated comonomer, or (b) a copolymer of a water-soluble salt of said ester with an ethylenically unsaturated comonomer; the copolymer having a molecular weight such that the viscosity of a 1 percent by weight aqueous solution thereof as measured in a No. 3 Suspended Level Viscometer at 25° Co. is at least 40 centistokes, the comonomer being either water-soluble and present to the extent of not more than 40 percent by weight of the copolymer or water-insoluble and present to the extent of not more than 15 percent by weight of the copolymer whereby said colloidal and suspended impurities are flocculated and thereafter removing said impurities from the liquor.

2. Process according to claim 1 in which the copolymer is one whose 1 percent by weight aqueous solution viscosity measured in a No. 3 suspended level viscometer at 25° C. lies within the range 80 to 200 centistokes.

3. Process according to claim 1 in which the copolymer is derived from N,N-diethylamine ethyl acrylate or a water-soluble salt thereof.

4. Process according to claim 1 in which the comonomer is water-soluble and present to the extent of 3 to 30 percent by weight of the copolymer.

5. Process according to claim 1 in which the comonomer is acrylic acid, methacrylic acid, crotonic acid, itaconic acid, maleic acid, fumaric acid, a water-soluble mono-alkyl ester of maleic or fumaric acid, an amide or hydroxyethyl ester or hydroxypropyl ester of any of these acids, vinyl pyrolidone or a water-soluble alkyl vinyl ether.

6. Process according to claim 5 in which the amide is acrylamide or methacrylamide.

7. Process according to claim 1 in which the comonomer is water-insoluble and present to the extent of from 3 to 10 percent by weight of the copolymer.

8. Process according to claim 1 in which the comonomer is water-insoluble and is an alkyl ester derived from acrylic or methacrylic acid and an alcohol of the formula $C_nH_{2n+1}OH$ where $n$ is 1 to 8, styrene, methyl styrene, vinyl acetate, vinyl propionate, vinyl butyrate or acrylonitrile.

* * * * *